Patented Oct. 20, 1931

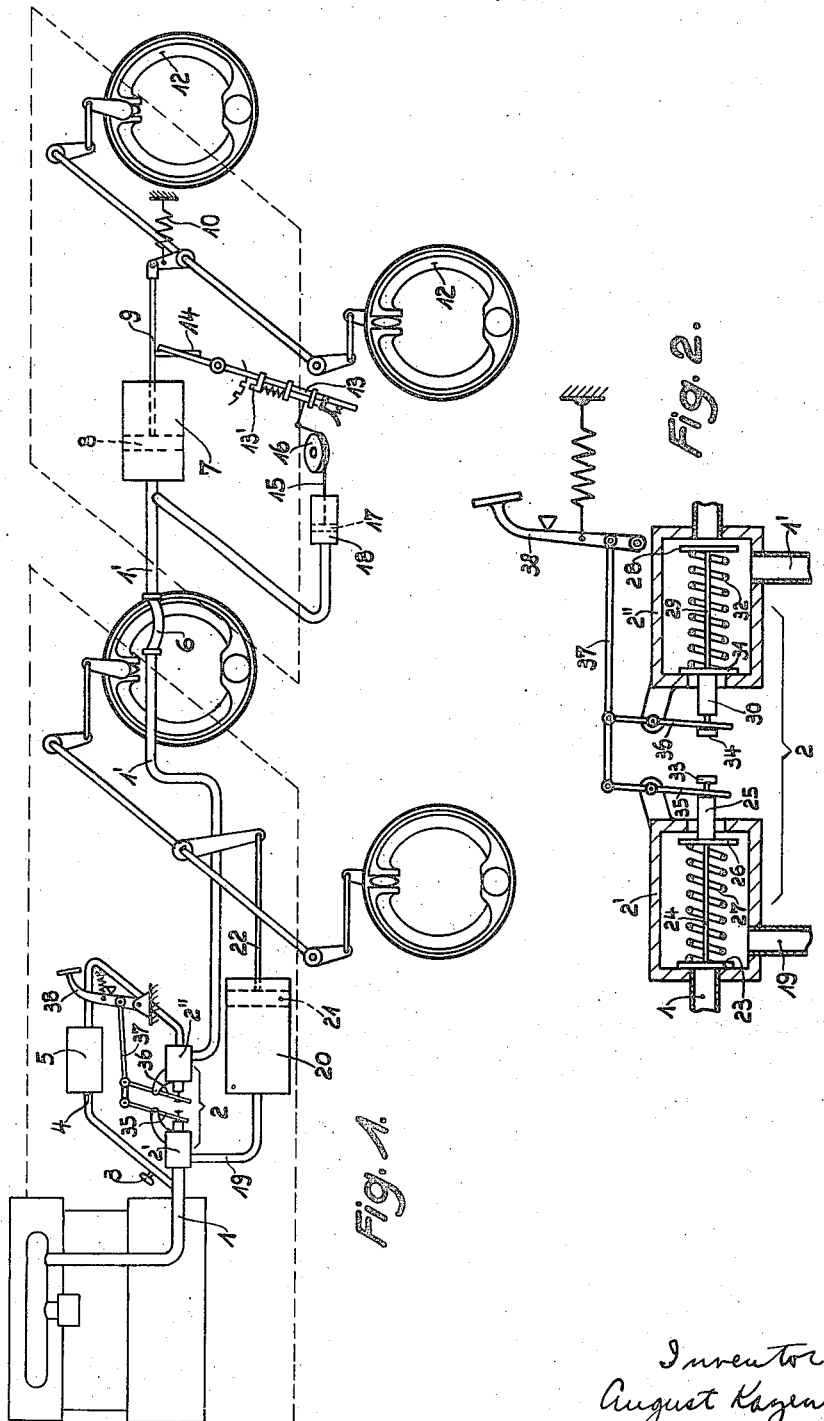

1,827,849

UNITED STATES PATENT OFFICE

AUGUST KAZENMAIER, OF STUTTGART, GERMANY, ASSIGNOR TO ROBERT BOSCH AKTIENGESELLSCHAFT, OF STUTTGART, GERMANY

BRAKE MECHANISM

Application filed June 3, 1929, Serial No. 368,104, and in Germany June 13, 1928.

The present invention relates to brake mechanisms for tractor and trailer vehicles.

Servo mechanisms for vehicle brakes are known in which pressure or vacuum is set up by driving mechanism, to release the brakes and at the same time to store up energy which when released applies the brakes.

This energy may be stored up by allowing the pressure or vacuum to act on a piston which tensions a spring, raises a weight, or the like. On removing the pressure acting on the piston the tension of the spring, the weight, or other means is released and applies the brakes.

These brake mechanisms have the advantage that on breaking the coupling between a tractor and a trailer vehicle and the consequent breakage of the connecting pipe, the vacuum or pressure in the brake pipe disappears, whereby the brakes are immediately brought into operation without any auxiliary mechanism. The brakes naturally bring the trailer to rest when it is uncoupled from the tractor vehicle since the pipe connection between the two vehicles is thereby broken. In order to be able to release the brakes on the uncoupled trailer, a hand-operated mechanism, for example a locking lever by which the brakes can be held in the "off" position is used in known manner. The braking energy must of course be again stored up by hand.

Brake servo-mechanisms of this type have various disadvantages, which are removed by the present invention.

On coupling up the unbraked trailer, omission to release the lever keeping the brakes off may occur. Consequently the trailer follows the tractor vehicle freely but it cannot be braked. According to the invention, the vacuum or pressure, which keeps the brakes off when running, is used to regulate automatically the mechanical brake release mechanism immediately the trailer is coupled up and the vacuum or pressure in the tractor vehicle is sufficient to keep the trailer brakes released.

A brake servo mechanism is in this case preferably selected for the tractor vehicle, particularly when using vacuum brakes, which used the vacuum to apply the brakes, so that the vacuum is not simultaneously required for the tractor and trailer brakes. An air suction servo mechanism of known construction in which the brakes are applied when the vacuum acts on the braking cylinder will suffice for the tractor vehicle. The brakes of both vehicles are controlled from the tractor by the brake lever (pedal or hand lever) of the tractor allowing atmospheric air to enter the braking cylinder of the tractor vehicle through a controlled valve construction in the form of a double valve when air is sucked out of the braking cylinder of the tractor vehicle, and vice versa.

When the energy for applying the tractor brakes is stored up by means of springs, it is often preferable to provide a spring for each wheel and to connect the springs with the air cylinder for the brakes by means of a compensating lever, since it is then unnecessary to compensate on braking. If, however, only one spring is used for all the wheels to be braked, it can be protected and covered in the air cylinder for the brakes. In the case of four wheel brakes on the trailer, an air cylinder is preferably provided for the brakes of each pair of wheels. Both cylinders can in this case also be operated from the tractor vehicle by a common control valve. It is preferable however to have only a single mechanical brake release mechanism, and control therefore, for both cylinders.

One form of construction according to the invention applied to vacuum brakes is shown in the accompanying drawings in which:—

Figure 1 shows the assembly of the brake mechanism in the tractor and trailer vehicles, and Figure 2 is a longitudinal section through the common control valve.

A pipe 1 leads from the suction pipe of the engine of the tractor vehicle and divides into two branches, one leading to an element 2' of the housing for a common control valve 2 for both vehicles and the other through a cock 3 mounted in the driving cab of the motor vehicle and a non-return valve 4 into an air vessel 5. This branch then passes from the air vessel 5 to an element 2″ of the housing for the common control valve 2 and thence through a pipe connection 6 to an air cylinder 7 for operating the trailer brakes. A piston 8 within the cylinder 7 is drawn towards the open end of the cylinder by one or more springs 10 through a rod 9.

The rod 9 can be operated upon so as to release the brakes by a hand lever 13 which abuts against a boss 14 mounted thereon, the lever being held in position by a pawl or detent element 13′. This pawl is connected by means of a cable 15 and a roller 16 with a piston 17 in a small cylinder 18 connected up with the pipe 6.

A duct 19 leads from the element 2′ of the control valve housing into the brake cylinder 20. The piston 21 of this cylinder operates the brake rod 22 of the motor vehicle brakes. For this purpose a valve plate 23 with spindle 24 and a hollow spindle 25 of a second valve plate 26 moving over this spindle are arranged in the chamber 2″. Both valve plates are forced on to their seatings by a spring 27, the seating for the plate 23 being connected with the suction pipe and that of the plate 26 with the atmosphere. The chamber 2″ is similarly provided with a valve 28, 29 for the vacuum and a valve 30, 31 for the atmosphere. The adjacent ends of the valve spindles 24 and 29 have attachments 33 and 34 acting as stops for the levers 35 and 36 actuated by the brake lever 38 by means of a rod 37.

The mechanism operates as follows:—

If when running it is desired to brake the trailer, the driver presses on the foot brake lever 38, thereby displacing the rod 37 to the left. The lever 35 moves the attachment 33 and thereby opens the vacuum valve 23 of the chamber 2′. The atmosphere valve 26 is closed by the spring 27. The piston 21 of the brake cylinder is drawn to the left and applies the brakes.

The lever 36 also moves simultaneously with the lever 35 and thereby raises the atmosphere valve 30, 31, so that atmospheric air flows into the valve chamber 2″ and accordingly into the connecting pipe 1′ and the air cylinder 7 of the trailer brakes. The piston 8 is thereby released and the springs 10 apply the brakes 12.

On releasing the braking lever 38 the atmospheric valve 26 of the chamber 2′ is opened and the cylinder 20 connected with the atmosphere, i. e. the brakes of the motor vehicle are released. In the chamber 2″ on the other hand the pipe 1′ and the air cylinder 7 for the brakes are connected through the valve 28 with the suction air vessel 5 and the trailer brakes are thereby also released.

If the trailer breaks away, the connecting pipe is also broken and air can enter the brake cylinder 7. The spring tension maintained in equilibrium by the vacuum is released and applies the brakes.

The air vessel with the non-return valve is adapted to maintain a continuous vacuum sufficient to release the trailer brakes (particularly in the case of a plurality of trailers). The air vessel can be cut off from the suction pipe by the stop cock 3 when travelling without trailers. A non-return valve can also be provided in the pipe between the air vessel and the control valve member for the trailer brakes in order to prevent atmospheric air entering.

It must also be possible to release the brake of a trailer when the trailer is uncoupled, either in order to move it or to couple it up again to a tractor vehicle, and to allow it to move freely.

This is obtained by reversing the hand lever 13. The short arm of this lever acts on the pin 14 and displaces the piston to the left, tensioning the spring 10. The hand lever is retained in the end position, corresponding to the "off" position of the brakes, by the pawl 13′. When permanently locked in position the lever would however prevent application of the brakes. If the lever has to be released by hand, this may easily be omitted and the driver of the motor vehicle cannot then brake the trailer. This is prevented by the vacuum set up by the engine not only acting on the brake cylinder 7, but also on the piston 17 of the auxiliary cylinder 18. The piston 17 moves to the left under the action of the vacuum in the cylinder and thereby raises the pawl 13′ of the lever 13. The auxiliary cylinder 18 must be of such dimensions that the pawl 13′ is only raised when a vacuum sufficient to maintain the piston 8 in the "off" position of the brakes is set up in the suction pipe.

Claims:

1. Brake operating mechanism for tractor and trailer vehicles comprising pumping means on a tractor vehicle, servo mechanism on the tractor vehicle adapted to apply brakes on the tractor on connection with said pumping means, servo mechanism on a trailer adapted to release brakes on the trailer on connection with said pumping means, and means for connecting said servo mechanisms one at a time to said pumping means.

2. Brake operating mechanism for tractor and trailer vehicles comprising pumping means on a tractor vehicle, servo mechanism on the tractor vehicle adapted to apply brakes on the tractor on connection with said pumping means, servo mechanism on a trailer adapted to release brakes on the trailer on connection with said pumping means, and common control means for said servo mechanisms operable to connect said servo mechanisms one at a time to said pumping means.

3. Brake operating mechanism for tractor and trailer vehicles comprising pumping means, at least one servo cylinder on a tractor, at least one servo-cylinder on a trailer, brake pipes adapted to connect said pumping means with said cylinders, valve means in each of said brake pipes governing the flow of fluid relatively to said cylinders, a piston within the tractor servo cylinder adapted to apply the tractor brakes on connection of said cylinder with the pumping means and a piston within the trailer servo cylinder adapted to release the trailer brakes on connection of said trailer servo-cylinder with the pumping means, and means for operating said valve means to connect said cylinders one at a time with said pumping means.

4. Brake operating mechanism for tractor and trailer vehicles comprising pumping means, at least one servo cylinder on a tractor, at least one servo-cylinder on a trailer, brake pipes adapted to connect said pumping means with said cylinders, valve means in each of said brake pipes governing the flow of fluid relatively to said cylinders, a piston within the tractor servo cylinder adapted to apply the tractor brakes on connection of said cylinder with the pumping means, a piston within the trailer servo cylinder and connected to the trailer brakes, means associated with said piston for storing up energy on connection of the trailer servo cylinder with said pumping means and for releasing said stored up energy to apply the trailer brakes on disconnection of the trailer cylinder from the pumping means, and means for connecting said cylinders one at a time to said pumping means.

5. Brake mechanism for trailer vehicles comprising brakes mounted on a trailer, pumping means, at least one servo cylinder mounted on a trailer, a brake pipe adapted to connect said servo cylinder with said pumping means, valve means in said brake pipe, a piston within said cylinder and connected to said brakes, storing means associated with said piston adapted automatically to store up energy on connection of said cylinder with the pumping means and to release said energy for application of the brakes on disconnection of said cylinder from the pumping means, manual means for storing up energy in said storing means and for maintaining the brakes in an "off" position, means for locking said manual means in position for maintaining said storing means in a charged condition and means for automatically releasing said locking means when the pumping effect on the piston of said servo cylinder is sufficiently great to maintain said storing means in a charged condition.

6. Brake mechanism for trailer vehicles comprising brakes mounted on a trailer, a servo cylinder on said trailer, a piston within said cylinder and connected to the brakes, a spring adapted to urge the piston into position for applying the brakes, pumping means adapted to be connected to said cylinder for supplying energy for moving the piston against the action of the spring into a brake release position, manual means for moving the piston into a brake release position, means for locking said manual means and piston in a brake release position and means for automatically releasing said locking means when the pumping effect on the piston is sufficient to maintain the piston in a brake release position.

7. Brake mechanism for trailer vehicles comprising two pairs of brakes, pumping means, a servo cylinder for each pair of brakes, brake pipes adapted to connect said servo cylinders with said pumping means, a control valve common to said brake pipes, a piston within each of said cylinders and connected to said pairs of brakes, means associated with said pistons for storing up energy separately for each pair of brakes on connection of said cylinders with the pumping means and manual means for maintaining the brakes in an "off" position, but only one means common to both pairs of brakes for automatically releasing said maintaining means when the pumping effect on the piston of said servo cylinder is sufficiently great to maintain said storing means.

8. Brake mechanism for trailer vehicles comprising brakes mounted on a trailer, a servo cylinder on said trailer, a piston within said cylinder and connected to the brakes, a spring adapted to urge the piston into position for applying the brakes, pumping means adapted to be connected to said cylinder for supplying energy for moving the piston against the action of the spring into a brake release position, manual means for moving the piston into a brake release position, means for locking said manual means and piston in a brake release position, an auxiliary servo cylinder connected to said pumping means and an auxiliary piston within said auxiliary cylinder connected to said locking means for releasing the locking means when the pumping effect on the piston is sufficient to maintain the piston in a brake release position.

9. Brake mechanism for trailer vehicles comprising brakes mounted on a trailer, a servo cylinder on said trailer, a piston within said cylinder and connected to the brakes, a spring adapted to urge the piston into position for applying the brakes, pumping means, adapted to be connected to said cylinder for supplying energy for moving the piston against the action of the spring into a brake release position, a pivoted lever for moving the piston into a brake release position, a detent element on said lever for locking the lever and piston in a brake release position, an auxiliary servo cylinder connected to said pumping means and an auxiliary piston within said auxiliary cylinder connected to said detent element for releasing the detent element when the pumping effect on the piston is sufficient to maintain the piston in a brake release position.

10. A dual control valve for servo mechanisms for brakes of a tractor and trailer vehicle comprising a pair of casings, a pipe leading from each of said casings and adapted to be connected to pumping means, a pump valve in each casing at the end of each pipe, an atmospheric valve in each casing, a brake pipe leading from each casing, and commonly operated pivoted levers, adapted on movement in either direction to open the pump valve of one casing and the atmospheric valve of the other.

11. Brake operating mechanism for tractor and trailer vehicles comprising pumping means on a tractor vehicle, servo mechanism on the tractor vehicle adapted to apply brakes on the tractor on connection with said pumping means, servo mechanism on a trailer adapted to release brakes on the trailer on connection with said pumping means, valve means for the tractor and trailer servo mechanisms and common control means for said valve means to cause disconnection of the trailer servo mechanism from the pumping means on connection of the tractor servo mechanism therewith and vice versa.

12. Brake mechanism for trailer vehicles comprising a brake mounted on a trailer, means for applying said brake, manual means for releasing said brake, means for holding said manual means in brake-releasing position, and servo mechanism for releasing said holding means.

13. Brake mechanism for trailer vehicles comprising a brake mounted on a trailer, means for applying said brake, manual means for releasing said brake, means for locking said manual means in brake-releasing position, and servo mechanism operable to release said locking means and said brake.

14. Brake operating mechanism for tractor and trailer vehicles comprising a source of fluid under pressure, a brake on the tractor, servo mechanism on the tractor adapted to apply the tractor brake on connection with said source, a brake on the trailer, means on the trailer for applying the trailer brake, servo mechanism on the trailer adapted to release the trailer brake on connection with said source, manual means on the trailer for releasing the trailer brake, means for locking said manual means in brake-releasing position, and servo mechanism on the trailer for releasing said locking means.

In testimony whereof I have hereunto affixed my signature.

AUGUST KAZENMAIER.